US009479917B1

(12) United States Patent
Gota et al.

(10) Patent No.: US 9,479,917 B1
(45) Date of Patent: Oct. 25, 2016

(54) RATING GROUP-SPECIFIC ACTIONS FOR MOBILE NETWORKS

(71) Applicant: Juniper Networks, Inc., Sunnyvale, CA (US)

(72) Inventors: Venkatesh B R Gota, Bangalore (IN); S. Samuel Natarajan, Bangalore (IN); Kapil Bajaj, Fremont, CA (US); Ravi Subrahmanya, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 638 days.

(21) Appl. No.: 13/902,567

(22) Filed: May 24, 2013

(51) Int. Cl.
*H04M 11/00* (2006.01)
*H04W 4/26* (2009.01)

(52) U.S. Cl.
CPC ..................................... *H04W 4/26* (2013.01)

(58) Field of Classification Search
USPC ........................................ 455/405, 406, 408
See application file for complete search history.

(56) References Cited

U.S. PATENT DOCUMENTS

| 7,769,877 | B2 * | 8/2010 | McBride | ............... | H04W 12/06 709/230 |
| 2012/0144049 | A1 * | 6/2012 | Lopez Nieto | ........... | H04L 12/14 709/228 |

OTHER PUBLICATIONS

3GPP TS 23.203 V11.8.0, "3rd Generation Partnership Project; Technical Specification Group Services and Systems Aspects; Policy and charging control architecture; (Release 11)," Technical Specification, Dec. 2012, 179 pp.
3GPP TS 32.299 V11.6.0, "3rd Generation Partnership Project; Technical Specification Group Services and Systems Aspects; Telecommunication management; Charging management; Diameter charging applications (Release 11)," Technical Specification, Dec. 2012, 152 pp.
3GPP TS 32.240 V12.0.0, "3rd Generation Partnership Project; Technical Specification Group Services and Systems Aspects; Telecommunication management; Charging management; Charging architecture and principles (Release 12)," Technical Specification, Mar. 2013, 45 pp.
3GPP TS 29.212 V11.7.0, "3rd Generation Partnership Project; Technical Specification Group Services and Systems Aspects; Policy and Charging Control (PCC); Reference points (Release 11)," Technical Specification, Dec. 2012, 197 pp.

(Continued)

*Primary Examiner* — Vladimir Magloire
*Assistant Examiner* — Sayed T Zewari
(74) *Attorney, Agent, or Firm* — Shumaker & Sieffert, P.A.

(57) ABSTRACT

In general, techniques are described for facilitating fine-grained charging control for multi-service subscriber sessions by configuring charging control actions for application to services at the rating group level. For example, a mobile network gateway includes configuration information that defines a plurality of rating groups for a subscriber session, wherein each of the plurality of rating groups is associated with at least one service, and wherein the configuration information defines an actionable event and a corresponding charging control action for a rating group of the plurality of rating groups. A subscriber management module establishes a bearer of the mobile network for the subscriber session and associates the plurality of rating groups with the bearer. A charging client determines the occurrence of the actionable event defined by the configuration information for the rating group and applies the corresponding charging control action for the actionable event to the rating group.

19 Claims, 4 Drawing Sheets

(56) References Cited

OTHER PUBLICATIONS

3GPP TS 23.401 V10.0.0, "3rd Generation Partnership Project; Technical Specification Group Services and Systems Aspects; General Packet Radio Service (GPRS) enhancements for Evolved Universal Terrestrial Radio Access Network (E-UTRAN) access (Release 10)," Technical Specification, Jun. 2010, 261 pp.

3GPP TS 36.300 V10.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," Technical Specification, Jun. 2010, 183 pp.

U.S. Appl. No. 12/947,463, filed Nov. 16, 2010 and entitled "Policy and Charging Control Rule Precedence Mapping in Wireless Connectivity Access Networks,".

U.S. Appl. No. 13/172,556, filed Jun. 29, 2011 and entitled "Mobile Network Gateway Having Decentralized Control Plane for Anchoring Subscriber Sessions,".

U.S. Appl. No. 13/172,505, filed Jun. 29, 2011 and entitled "Variable-Based Forwarding Path Construction for Packet Processing Within a Network Device,".

Hakala et al., "Diameter Credit-Control Application," RFC 4006, Internet Engineering Task Force, Network Working Group, Aug. 2005, 107pp.

* cited by examiner

RATING GROUP-SPECIFIC ACTIONS FOR MOBILE NETWORKS

TECHNICAL FIELD

This disclosure relates to computer networks and, more specifically, to charging control for mobile networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, an evolution of UMTS referred to as Long Term Evolution (LTE), mobile IP standardized by the Internet Engineering Task Force (IETF), as well as other standards proposed by the 3$^{rd}$ Generation Partnership Project (3GPP), 3$^{rd}$ Generation Partnership Project 2 (3GGP/2) and the Worldwide Interoperability for Microwave Access (Wi-MAX) forum.

A typical mobile service provider network, or "mobile network," includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs. In addition, while primarily described with respect to service providers and mobile service provider networks, a mobile network may be deployed by many different types of entities, including enterprises and government agencies. Accordingly, the term "mobile network" may be used herein to encompass many different types of cellular network architectures and operators.

Mobile networks perform detailed and accurate monitoring of service usage so that proper charging information can be generated for potentially millions of customers in order to provide revenue for the service providers. In general, there are three distinct aspects to the process that translates service use into a bill for services—charging, rating and billing. Charging gathers statistics regarding service usage for each customer. Rating is the process of determining how much each service used costs each particular customer according to the service contract. Billing is the process of generated a customer's invoice for services.

The mobile network gateway anchors subscriber sessions and executes network access control functions including charging control (also known as Policy and Charging Enforcement Function for 3GPP networks), which refers to the process of associating packets that belong to a service data flow to a charging key and applying online charging and/or offline charging, as appropriate (a charging key includes information used by the charging online and offline charging servers for rating purposes). Accordingly, the mobile network gateway collects charging information related to the external data network usage and to network resource usage, such as the amount of data categorized by quality of service (QoS), the user protocols, and the usage of the packet data protocol (PDP) address.

A mobile network gateway typically cooperates with online and offline charging server to perform the charging and rating processes in order to generate the charging information. In general, offline charging denotes a charging mechanism in which charging information does not affect, in real-time, the service(s) rendered. The network reports resource usage to the billing domains after the resource usage has occurred. By contrast, online charging can affect, in real-time, the service(s) rendered and therefore requires a direct interaction between the mobile network gateway and the online charging server for subscriber session and/or service(s) control. An online charging server typically maintains subscriber accounts that may be queried prior to granting permission to use requested network resources.

One application of online charging is credit control, in which delivery of subscriber services to a subscriber by the mobile network is predicated upon adequate credit in the form of a prepaid subscription, for instance. Example subscriber services include network (e.g., Internet) access, Session Initiation Protocol (SIP) services, messaging services, gaming services, and download services. For credit control, the mobile network gateway and online charging server cooperate to debit subscriber credit by rating services rendered in real-time and monitoring the subscriber account to ensure adequate credit prior to initiation of a chargeable event. The mobile network gateway and online charging server may deny the subscriber access to the requested service in the absence of adequate credit.

A single subscriber may use multiple services accessible by the mobile service provider network as part of a subscriber session. For example, during a single network access session of a subscriber session, a subscriber may use several Hypertext Transfer Protocol (HTTP) services. In some cases, the multiple services of the network access session may be subject to different cost and therefore require differential rating. To improve scalability for such scenarios, the mobile network gateway is able to consolidate different services that are subject to the same cost and rating type into a rating group, which is associated with a charging key. A subscriber session can include one or more rating groups each associated with one or more services for which the mobile network gateway applies credit control, i.e., associating packets to a rating group charging key for the services and applying online or offline charging, as appropriate. Aside from rating however, other attributes and actions of a multi-service subscriber session, such as quality of service (QoS), event triggers, and credit control failure handling, are common to all the services carried within the session bearer and are applied at the bearer level.

Additional information regarding charging control and management is found in "3GPP TS 23.203," 3rd Generation Partnership Project, Technical Specification Group Services and System Aspects, Policy and charging control architecture (Release 11), December, 2012; "3GPP TS 32.299," 3rd Generation Partnership Project, Technical Specification Group Services and System Aspects, Diameter charging applications (Release 11), December, 2012; "3GPP TS 32.240," 3rd Generation Partnership Project, Technical Specification Group Services and System Aspects, Charging architecture and principles (Release 12), March, 2013; and "Diameter Credit-Control Application," Request for Comments 4006, Internet Engineering Task Force, Network Working Group, August 2005; each of which being incorporated by reference in its entirety herein.

SUMMARY

In general, techniques are described for facilitating fine-grained charging control for multi-service subscriber sessions by configuring charging control actions for application to services at the rating group level. In one example implementation, an online charging system, including the online charging server and mobile network gateway, operates in accordance with configured rating group-specific actions to apply such actions with respect to services consolidated into the corresponding rating group. For example, a mobile network operator may configure the online charging system by defining signaling message triggering and failure handling for rating groups associated with a subscriber session rather than, or in addition to, definitions for the subscriber session as a whole. On the occurrence of an error message or other actionable event, such as an error message from the online charging server or indicia of a change in charging conditions, the mobile network gateway applies the action defined for the actionable event with respect to services that belong to the rating group with which the action is associated. As a result, the online charging system may provide the operator with flexibility to define triggers and failure handling at the rating group level of granularity, which may facilitate more fine-grained charging control in comparison to bearer-based charging control.

In one aspect, a method includes receiving, with a mobile network gateway that performs charging control for a mobile network, configuration information that defines a plurality of rating groups for a subscriber session, wherein each of the plurality of rating groups is associated with at least one service, and wherein the configuration information defines an actionable event and a corresponding charging control action for a rating group of the plurality of rating groups. The method also includes establishing, with the mobile network gateway, a bearer of the mobile network for the subscriber session and associating the plurality of rating groups with the bearer. The method further includes determining, with the mobile network gateway, the occurrence of the actionable event defined by the configuration information for the rating group. The method also includes applying the corresponding charging control action for the actionable event to the rating group.

In another aspect, a non-transitory computer-readable medium contains instructions. The instructions cause one or more programmable processors to receive, with a mobile network gateway that performs charging control for a mobile network, configuration information that defines a plurality of rating groups for a subscriber session, wherein each of the plurality of rating groups is associated with at least one service, and wherein the configuration information defines an actionable event and a corresponding charging control action for a rating group of the plurality of rating groups. The instructions also cause the one or more programmable processors to establish, with the mobile network gateway, a bearer of the mobile network for the subscriber session and associating the plurality of rating groups with the bearer. The instructions also cause the one or more programmable processors to determine, with the mobile network gateway, the occurrence of the actionable event defined by the configuration information for the rating group. The instructions also cause the one or more programmable processors to apply the corresponding charging control action for the actionable event to the rating group.

In another aspect, a mobile network gateway includes a control unit having at least one processor. The mobile network gateway also includes configuration information that defines a plurality of rating groups for a subscriber session, wherein each of the plurality of rating groups is associated with at least one service, and wherein the configuration information defines an actionable event and a corresponding charging control action for a rating group of the plurality of rating groups. A subscriber management module of the control unit is configured to establish a bearer of the mobile network for the subscriber session and associate the plurality of rating groups with the bearer. A charging client of the control unit is configured to determine the occurrence of the actionable event defined by the configuration information for the rating group and apply the corresponding charging control action for the actionable event to the rating group.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
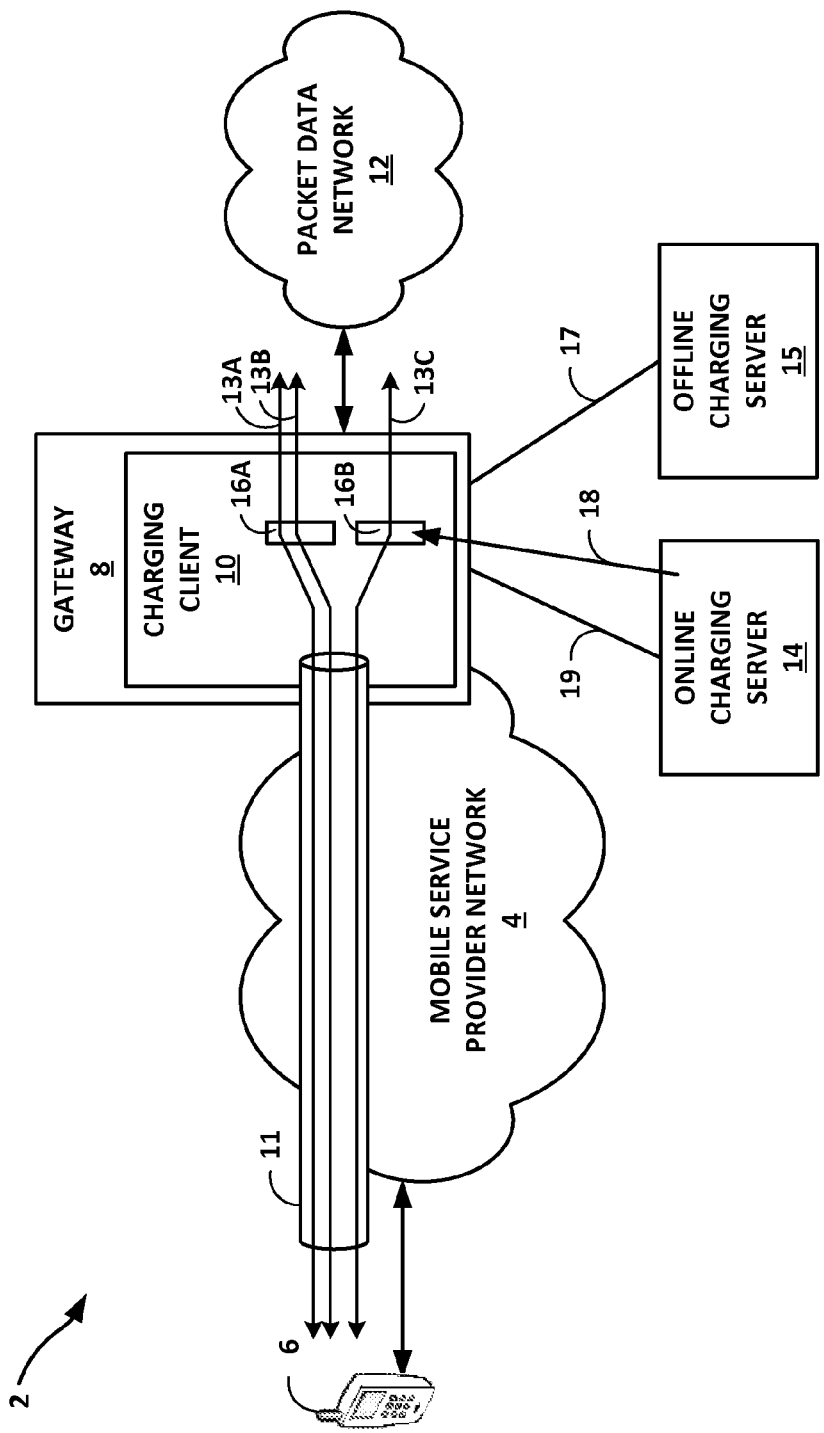
FIG. 1 is a block diagram illustrating an example network system that performs fine-grained charging control at the rating group level for multi-service subscriber sessions according to techniques described in this disclosure.

FIG. 1 is a block diagram illustrating an example network system that performs fine-grained charging control at the rating group level for multi-service subscriber sessions according to techniques described in this disclosure. In this example, network system 2 includes packet data network (PDN) 12 coupled to mobile service provider network 4 ("mobile network 4") via gateway 8 of mobile network 4. Packet data network 12 supports one or more packet-based services that are available for request and use by wireless device 6. As examples, PDN 12 may provide, for example, bulk data delivery, voice over Internet protocol (VoIP), Internet Protocol television (IPTV), Short Messaging Service (SMS), Wireless Application Protocol (WAP) service, Session Initiation Protocol (SIP) services, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates mobile network 4, an enterprise IP network, or some combination thereof. In various instances, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Wireless device 6 is a wireless computing device that may represent, for example, a mobile telephone, a laptop or desktop computer having, e.g., a 3G/4G wireless card or hub, wireless-capable netbook, video game device, pager, smart phone, a personal data assistant, or any combination of these items. Wireless device 6 may run one or more applications, such as VoIP clients, video games, videoconferencing, E-mail, and Internet browsers, among others. Certain applications running on wireless device 6 may require access to services offered by PDN 12. Wireless device 6 may also be referred to, in various architectural embodiments for example, as User Equipment (UE), a Mobile Station (MS), a subscriber device, or a mobile device.

A mobile service provider operates mobile network 4 to provide network access, data transport and other services to wireless device 6. In general, mobile network 4 may implement any commonly defined cellular network architecture including those defined by standards bodies, such as a Global System for Mobile communication (GSM) Association, a $3^{rd}$ Generation Partnership Project (3GPP), a $3^{rd}$ Generation Partnership Project 2 (3GGP/2), an Internet Engineering Task Force (IETF) and a Worldwide Interoperability for Microwave Access (WiMAX) forum. For example, mobile network 4 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Mobile network 4 may, alternatively or in conjunction with one of the above, implement a code division multiple access-2000 ("CDMA2000") architecture. Mobile network 4 may, again as an alternative or in conjunction with one or more of the above, implement a WiMAX architecture defined by the WiMAX forum.

Mobile network 4 may include a core packet-switched network (not shown in FIG. 1) and one or more radio access networks (also not shown in FIG. 1). A core packet-switched network of mobile network 4 may comprise, for example, a GPRS core packet-switched network, an IP-based mobile multimedia core network, or an Evolved Packet Core (EPC). Wireless device 6 communicates with mobile network 4 using a wireless communication link to one of the radio access networks of the mobile network. Radio access networks of mobile network 4 may include, for example, for example, a GSM Radio Access Network (GRAN), a WiMAX radio access network, a UMTS Radio Access Network (UTRAN), and/or an evolution of a UTRAN known as an E-UTRAN. Mobile network 4 may further include a backhaul or transport network (not shown) that includes land-based transmission lines, frequently leased by a service provider for the mobile network, to transport user and control traffic between wireless device 6 and gateway 8. The backhaul network also includes network devices such as aggregation devices and routers.

Gateway 8 is a network device that operates as a gateway to PDN 12 and may represent, for example, a Gateway GPRS Serving Node (GGSN), an Access Gateway (aGW), a Packet Gateway (P-GW), or any combination of the above. Gateway 8 may comprise a router. While described herein with respect to one or more particular architectures for ease of illustration purposes, mobile network 4 may implement any architecture including those set forth by any standards body and those proprietarily owned. Moreover, the techniques may apply to any mobile data protocol supported by these architectures. The techniques therefore should not be limited to cellular architectures referenced to herein and the mobile data protocols supported by these architectures. Gateway 8 and other elements of mobile network 4 may, therefore, each represent an abstraction of devices found within any type of mobile network architectures.

Mobile network 4 establishes and operates bearers to transport user traffic, in the form of PDP packet data units (PDUs), referred to hereinafter as "packets." In general, a bearer is a set of network resources and data transport functions in mobile network 4 to deliver user traffic between two network entities. A bearer may include a path, a logical connection, or a physical or wireless connection between two network devices. A bearer may comprise, for example, an Evolved Packet System (EPS) bearer. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

Wireless device 6 attaches to mobile network 4, which establishes a subscriber session typically including a default bearer to carry user traffic for the wireless device as part of an attach procedure. The subscriber session is an association between mobile network 4 and wireless device 6 that is identifiable by a combination of a wireless device 6 PDP address and an Access Point Name (APN) or other PDN identifier for PDN 12. In instances of mobile service provider network 4 that include an IP-based connectivity access network (IP-CAN), a subscriber session represents an IP-CAN session. A subscriber session may represent and alternatively be referred to as a PDP context.

Besides establishing a default bearer, the attach procedure may trigger establishment, by mobile network 4, of one or more dedicated bearers between gateway 8 and wireless device 6 to carry user traffic for the subscriber session. Dedicated bearers operate according to a different set of quality of service (QoS) parameters and thus provide QoS differentiation to packet flows of various services engaged by wireless device 6. For example, various dedicated bearers may provide different guaranteed bit rates (GBR bearers) (or may not provide a guaranteed bit rate), maximum bit rates (MBRs), priority, packet delay budget, packet error loss rate, and allocation and retention priority (ARP) characteristics. A particular bearer may transport packet flows for multiple services of a subscriber session when the QoS characteristics of the bearer match the requirements of the services.

Gateway 8 includes charging client 10 that implements charging control for mobile network 4. Charging client 10 may, for instance, implement a Policy and Charging Enforcement Function (PCEF), which provides service data flow detection, user plane traffic handling, triggering control plane session management in some instances, QoS handling, and service data flow measurement as well as online and offline charging interactions with online charging server 14 and offline charging server 15. In some examples, charging client 10 provides policy and charging control (PCC) functionality. In such examples, an operator and/or an external entity, such as a Policy and Charging Rules Function (PCRF) entity (not shown in FIG. 1), provisions charging client 10 with one or more PCC rules that each specify a set of information enabling the detection of a service data flow and providing policy control and/or charging control parameters. Charging client 10 then enforces service flow-based policy and charging control according to the PCC rules. Further example details regarding policy and charging control are found in "3GPP TS 23.203," incorporated above, as well as in U.S. patent application Ser. No. 12/947,463, filed Nov. 16, 2010, which is incorporated by reference herein in its entirety.

To facilitate offline charging, gateway 8 exchanges communications with offline charging server 15 by interface 17, which may implement a Ga reference point and may include a communication link. With offline charging, offline charging server 15 collects charging information for network resource usage from gateway 8 and, in some cases, other elements of mobile service provider network 4 concurrently with that resource usage. In this sense, gateway 8 (more particularly charging client 10) may provide an offline charging data function (CDF) for network system 2 and offline charging server 15 may provide a charging gateway function (CGF).

To facilitate an online charging, gateway 8 exchanges communications with online charging server 14 by interface 19, which may implement a Gy/Ro reference point and may include a communication link. Online charging server 14 may include a Remote Authentication Dial-In User Service (RADIUS) serve and may provide real-time credit control by performing transaction handling, rating, and online correlation and management of subscriber accounts for mobile network 4. For example, charging client 10 collects charging information, e.g., chargeable events and requested network resource usage, and forwards the charging information to online charging server 14 providing the online charging function (OCF) in order to obtain authorization to provide the requested resources or chargeable events. In this way, charging client 10 may provide an online charging trigger function (OTF). Additional details regarding online and offline charging may be found in TS 32.240 and TS 32.299, each incorporated above.

In the example of FIG. 1, mobile service provider network 4 establishes bearer 11 for a subscriber session for wireless device 6. Bearer 11 may represent a default or dedicated bearer. Mobile service provider network 4 maps packets associated with any of multiple services 13A-13C (collectively, "services 13") to bearer 11, which mobile service provider network 4 uses to transport the mapped packets in the downlink direction from gateway 8 toward wireless device 6 and in the uplink direction from wireless device 6 to gateway 8. Each of services 13 may represent, e.g., conversation voice or video, real-time gaming, buffered streaming, Transmission Control Protocol (TCP)-based services (such as Internet access, HTTP-service, e-mail, chat, File Transfer Protocol (FTP), and Peer-to-Peer (P2P) services), IP Multimedia Subsystem (IMS) signaling, and so forth. Packets associated with service 13A, for example, may constitute one or more packet flows that match a service data flow (SDF) filter of an SDF template for the service.

Charging client 10 is configured to implement rating groups 16A-16B (collectively, "rating groups 16") that each consolidates credit allocation for one or more services in order to provide aggregated credit control for multiple services. Each of rating groups 16 may be associated with a charging key that provides rating information for matching service, such as cost per service unit. In this way, rating groups 16 each gather a set of services subject to the same cost and rating type. As illustrated in FIG. 1, rating group 16A consolidates credit allocation and rating for services 13A, 13B, while rating group 16B provides credit allocation and rating for service 13C. Accordingly, charging client 10 associates packets of services 13A, 13B to rating group 16A and applies the corresponding charging key to rate the service used for credit control purposes. Although illustrated with respect to a single subscriber session for wireless device 6 having a single bearer 11 associated with two rating groups 16, charging client 10 may be configured to provide subscriber sessions for many thousands of wireless devices, each using one or more bearers to transport service data traffic, in the form of packets, where each bearer may be associated with one or more rating groups for differential rating of packets transported by the bearer.

In accordance with techniques of this disclosure, charging client 10 enables fine-grained charging control by applying charging control actions to services 13 according to an association of a service 13 with one of rating groups 16. In other words, in response to an actionable event, such as a control message from any of online charging server 14, offline charging server 15, or mobile network 4, charging client 10 responsively applies actions to services 13 at the rating group level of granularity rather than at the level of bearer 11. In some cases, charging client 10 eschews actions with respect to services 13 according to association with one of rating groups 16. As used herein, applying an action to any of services 13 encompasses both applying an action to the service and eschewing an action with respect to the service that would otherwise be performed.

For example, on the occurrence of an actionable event, such as a credit control error message from online charging server 14 or a control message providing indicia of a change in charging conditions received from mobile network 4, charging client 10 gateway 8 applies the action defined for the actionable event with respect to only those of services 13 that belong to any of rating groups 16 with which the action is associated. As a result, mobile network gateway 8 may give the service provider for mobile network 4 flexibility to define triggers and failure handling, among other actions, for rating groups 16 and respective associated services 13, which may facilitate more fine-grained charging control at the rating group level in comparison to bearer-based charging control. As illustrated, for instance, online charging server 14 sends control message 18 associated with an actionable event to charging client 10 of gateway 8. Charging client 10 maps control message 18 to rating group 16B, determines a corresponding action configured for the control message 18, and applies the action to rating group 16B including service 13C.

Figure 2:
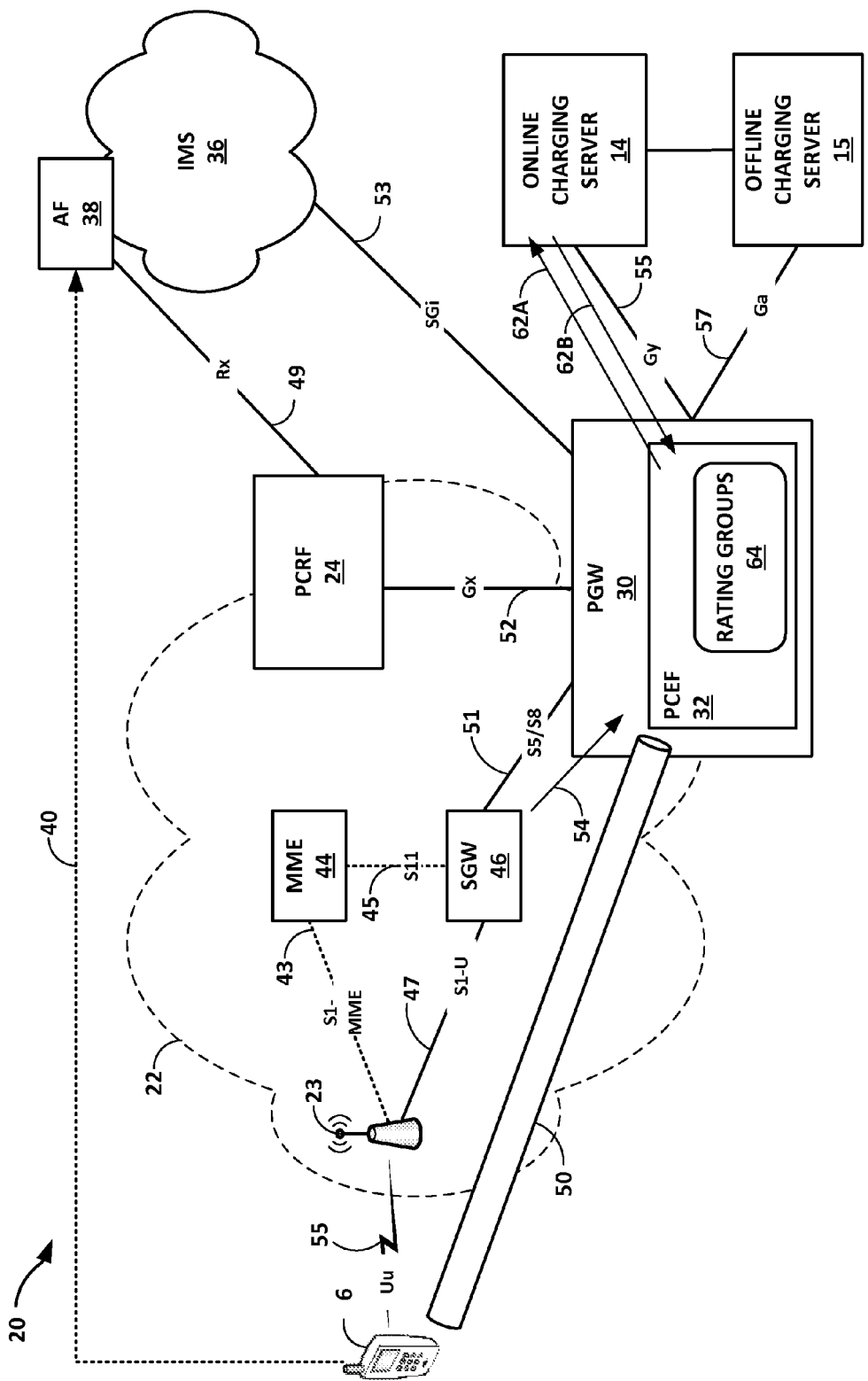
FIG. 2 is a block diagram illustrating, in further detail, an example network system that performs fine-grained charging control at the rating group level for multi-service subscriber sessions according to techniques described in this disclosure.

FIG. 2 is a block diagram illustrating an example network system that performs fine-grained charging control at the rating group level for multi-service subscriber sessions according to techniques described in this disclosure. Network system 20 may represent an example instance of network system 2 of FIG. 1. Network system 20 includes a Long Term Evolution (LTE) mobile service provider network 22 ("mobile network 22") that includes an Evolved Packet Core (EPC) interfaced to an Evolved UTRAN (E-UTRAN) 23. Mobile network 22 enables and transports service data exchanged between wireless device 6 and IP Multimedia Subsystem (IMS) network 36. Mobile network 22 may represent an embodiment of mobile service provider network 4 of FIG. 1.

Mobile network 22 provides mobility management, session management, and packet routing and transfer for network system 20. The mobile network 22 EPC comprises PDN Gateway 30 ("PGW 30") logically connected to Serving Gateway 46 ("SGW 46") via S5/S8 interface 51 operating over a communication link. PGW 30 hosts packet filtering, lawful interception, PDP address allocation, and other functionality. PGW 30 may implement an edge router between mobile network 22 and external PDNs, e.g., IMS 36. As described in additional detail below, PGW 30 comprises Policy and Charging Enforcement Function (PCEF) 32 to perform packet gating, filtering, and charging control.

PGW 30 may represent an example instance of gateway 8 of FIG. 1. S5/S8 interface 51 provides protocols to foster user plane tunneling and tunnel management between PGW 30 and SGW 46. S5/S8 interface 51 may comprise a user plane protocol stack that includes GPRS Tunneling Protocol-User Plane (GTP-U) executing over User Datagram Protocol/Internet Protocol (UDP/IP). The term "communication link," as used herein, comprises any form of transport medium, wired or wireless, and can include intermediate nodes such as network devices. SGW 46 hosts mobility anchoring, packet routing and forwarding, lawful interception, and other functionality.

The mobile network 22 EPC additionally includes Mobility Management Entity 44 ("MME 44") logically connected to SGW 46 via S11 interface 45 operating over a communication link. S11 interface 45 provides protocols with which MME 44 establishes and manages bearers that traverse or terminate at SGW 46. S11 interface 45 may comprise a control plane protocol stack that includes GTP-Control Plane (GTP-C) executing over UDP/IP. In addition to bearer management and establishment, MME 44 hosts Non-Access Stratum (NAS) signaling, PDN 30 and SGW 46 selection, roaming, and authentication, for instance. In various embodiments, mobile network 22 comprises additional MMEs, SGWs, and/or PGWs.

SGW 46 and MME 44 connect to E-UTRAN 23 via respective aspects of an S1 interface. Specifically, SGW 46 logically connects to individual E-UTRAN 23 via S1-U interface 47 operating over a communication link, and MME 44 logically connects to individual E-UTRAN 23 via S1-MME interface 43 operating over a communication link to establish bearers over S1-U interface 47 between SGW 46 and E-UTRAN 23. E-UTRAN 23 comprises one or more eNode Bs. E-UTRAN 23 is communicatively coupled to wireless device 6 via a radio link operating over Uu interface 55.

Wireless device 6, which represents an instance of wireless device 6 of FIG. 1, is a User Equipment (UE) that attaches to mobile network 22 to receive services during an attachment session identifiable by a combination of a wireless device 6 PDP address and an IMS 36 APN. Applications executing on wireless device 6 issues resource requests 40 to application function 38 to initiate service sessions for corresponding services. Resource requests 40 are application-layer signaling messages Network 20 additionally includes IP Multimedia Subsystem 36 ("IMS 36"), an operator service that the operator of mobile network 22 may use to provide services using, for example, the Session Initiation Protocol (SIP). In some aspects, IMS 36 represents one or more other instances of the services layer that provides services to devices, including wireless devices, attached to respective connectivity access networks, such as mobile network 22. For example, IMS 36 may represent non-IMS based operator services operating according to other standard or proprietary protocols. As another example, IMS 36 may represent services not provided by the operator of mobile network 22 and instead provided, for instance, via the Internet or another packet data network.

IMS 36 comprises application function 38 ("AF 38"), an IMS 36 element that offers applications requiring dynamic policy and/or charging with control over service data traffic that traverses mobile network 22. Application function 38 is communicatively coupled to Policy Control and Charging Rules Function entity 24 ("PCRF 24") via Rx interface 49. Application function 38 receives resource requests 40, which each comprise a request for a different service session, such as an IMS voice call, from wireless device 6. Application function 38 extracts service session description information from resource requests 40 and provides service session description information, such as Session Description Protocol (SDP) parameters, to PCRF 24 in service session description messages 49 sent over Rx interface 49. A service session may be alternatively referred to as an AF session or application session. PCRF 24 provides network control for mobile network 22 by way of service data flow (SDF) detection, QoS, gating and packet flow-based charging. PCRF 24 receives service session description information for service sessions in service session description messages 49, calculates the proper QoS authorization, and generates new (and/or modifies existing) PCC rules that determine treatment of matching service data flows in Policy Charging and Enforcement Function entity 32 ("PCEF 32") and other components of mobile network 22. PCRF 24 installs the new (and/or modified) PCC rules for service sessions to PCEF 32 using PCC rule installation messages 54 sent over Gx interface 52, a reference point between PCRF 24 and PCEF 32 that enables signaling of PCC rules. Gx interface 52 executes a communication protocol that may comprise, for example, Remote Authentication Dial-In User Service (RADIUS) or Diameter. PCRF 24 may be implemented within a router and, in various embodiments, mobile network 22 may comprise multiple PCRFs interconnected to multiple PGWs. In some instances, PCRF 24 receives service session information from PCEF 32, a Subscription Profile Repository (SPR), or a Bearer Binding and Event Reporting Function (BBERF) entity in addition to, or instead of, from AF 38.

PCEF 32 is a packet management entity of PGW 30 that performs service data flow detection, policy enforcement and flow based charging. PCEF 32 receives dynamic PCC rules determined by PCRF 24 for service sessions in PCC rule installation messages 54 via Gx interface 52. In some instances, an operator provisions PCEF 32 with pre-defined/static PCC rules created and configured by the operator.

Upon receiving new PCC rules for corresponding service sessions, PCEF 24 initiates establishment of new bearers, or modification or utilization of existing bearers and binds the bearers to the PCC rules. As a result, PCEF 32 causes PGW 30 to transport inbound packets that match service data flow templates of any of the PCC rules using the respective bearer to which the PCC rule is bound. PCEF 32 may bind multiple PCC rules to a single bearer.

In the illustrated embodiment, PCEF 32 upon receiving PCC rules in PCC rule installation messages 54 initiates establishment, within mobile network 22, of bearer 50 for the wireless device 6 session for transporting service data flows between wireless device 6 and IMS 36 by way of PGW 30. Bearer 50 may represent an EPS bearer or other 3GPP bearer. Charging control information in the PCC rules identify service data flows and specify parameters for charging control. The PCC rule policy and charging control information may depend on subscription information such as subscriber profiles configured within PGW 30 and associated with subscriber sessions for the subscriber, as described in further detail with respect to FIG. 3. PCEF 32 binds each of the received PCC rules generated for bearer 50 according to the policy control information specified within the respective PCC rules, and PCEF 32 performs charging control with respect to bearer 50 service data traffic according to charging control information included in the PCC rules and subscription information received and stored by PGW 30.

Subscription information of PCEF 32 includes one or more rating groups 64 that may each represent one of rating groups 16 of FIG. 1. One or more of rating groups 64 may be associated with SDF templates/PCC rules bound to bearer 50 such that PCEF 32 associates service data flows transported by bearer 50 with the associated rating group(s) for charging control purposes.

In accordance with techniques described herein, PCEF 32 may perform credit control failure handling and/or charging update signaling on a rating group-specific basis. In the illustrated example, PGW 30 receives a charging condition change message 54 for bearer 50 (or a session context that includes bearer 50) that includes indicia of a change in charging conditions for at least bearer 50. The indicia may indicate a change of, e.g., a time zone, Public Land Mobile Network (PLMN), Quality of Service (QoS), Radio Access Technology (RAT), SGW-MME, SGSN-SGW, or user location for wireless device 6, or may indicate Diameter Credit Control Application (DCCA) events. In contrast to conventional charging control, PCEF 32 may refrain from (i.e., eschew or exclude) triggering a charging update to offline charging server 15 on a rating group-specific basis. That is, for the set of one or more rating groups 64 associated with bearer 50, PCEF 32 may trigger a charging update for any subset of the rating groups 64 (or for none of rating groups 64) rather than for bearer 50 and all services transported by bearer 50.

In another illustrated example of the techniques described herein, PCEF 32 may issue a credit control request (CCR) message 62A to online charging server 14 requesting credit authorization or reauthorization for a given service (or one of rating groups 64 with which the given service is associated) transportable by bearer 50. Online charging server 14 returns a credit control failure message 62B that is responsive to CCR message 62A and indicates a credit control failure, which may include authorization rejected, credit control not applicable, end user service denied, and user unknown, among other failures. A credit control failure may include any indicia from online charging server 14 other than the allocation or approval of credit for the requested credit authorization. Another example of a credit control failure is non-responsiveness on behalf of online charging server 14.

In some instances, credit control failure message 62B may represent or be included in a credit control answer (CCA) message. Credit control failure message 62B may include an identifier for a particular rating group, e.g., in a rating-group attribute value pair (AVP).

Credit control failure message 62B may in some cases include a Multiple-Services-Credit-Control AVP (or "MSCC") of a CCA. PCEF 32 and online charging server 14 use MSCCs to enable independent credit control of multiple services in a single credit control session. Using MSCCs, PCEF 32 may request resources as a credit pool shared among multiple services, which can be grouped into one of rating groups 64 associated with a bearer. The MSCC of credit control failure handling message 62B identifies a rating group and includes a result-code AVP which may indicate that an error resulted from CCR message 62A. In accordance with techniques described herein, PCEF 32 applies, for the code value of the received result-code AVP, error handling action(s) that is configured specifically for the rating group. For example, PCEF 32 may map the code value to an actionable event defined by configuration information for the rating group and apply the corresponding error handling action(s). In this way, PCEF 32 can specify and/or override actions that PCEF 32 would otherwise perform with respect to the rating group in response to the code value of the received result-code AVP.

PCEF 32 applies any one or more error handling actions defined for the indicated credit control failure on a rating group-specific basis rather than applying the error handling actions to all associated rating groups and, by extension, to all services transported by bearer 50 between wireless device 6 and PGW 30. For example, bearer 50 may be associated with a first rating group and a second rating group of rating groups 64. In response to receiving credit control failure message 62A, PCEF 32 may apply a first error handling action defined for the first rating group and apply a second, different error handling action defined for the second rating group. In some cases, as where credit control failure message 62A includes an identifier for a particular rating group of rating groups 64, PCEF 32 may apply an error handling action defined for the identified rating group only with respect to the identified rating group. PCEF 32 may avoid performing the error handling action with respect to other rating groups 64 associated with bearer 50 or with respect to bearer 50 or the session context for bearer 50 as a whole.

Figure 3:
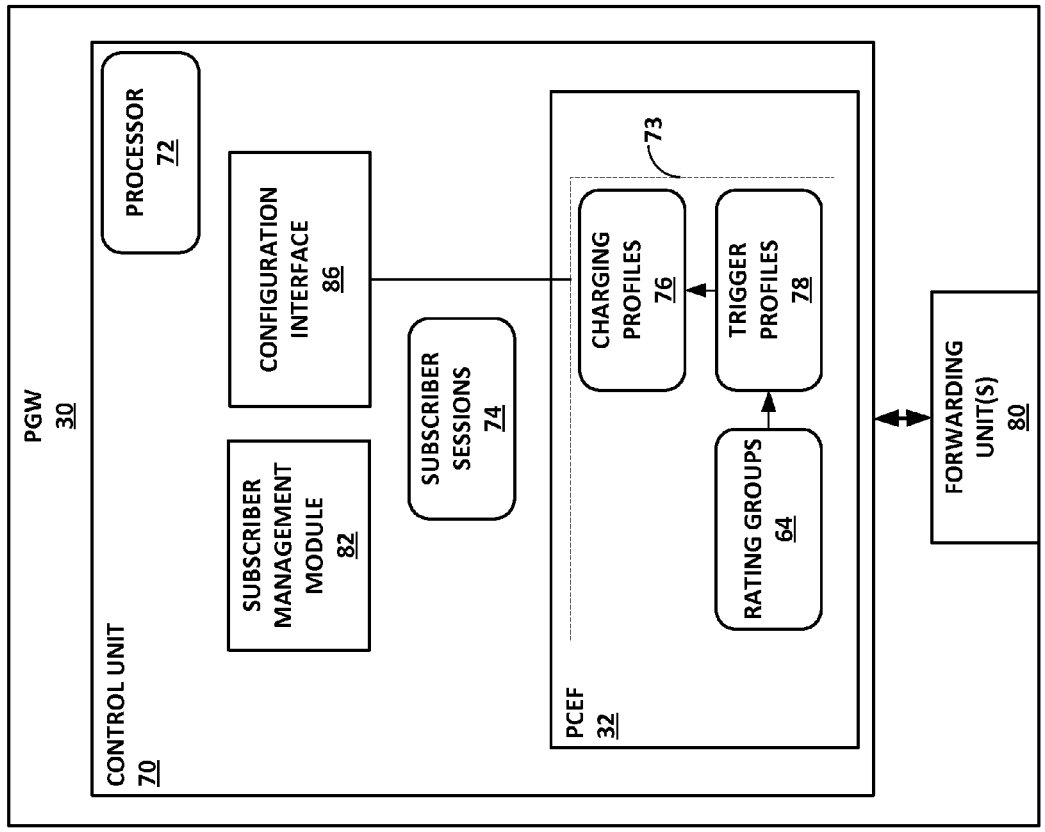
FIG. 3 is a block diagram illustrating an example mobile network gateway that performs fine-grained charging control at the rating group level for multi-service subscriber sessions according to techniques described in this disclosure.

FIG. 3 is a block diagram illustrating an example mobile network gateway that performs fine-grained charging control at the rating group level for multi-service subscriber sessions according to techniques described in this disclosure. PGW 30 may represent an example instance of mobile network gateway 8 of FIG. 1 or PGW 30 of FIG. 2. Control unit 70 includes one or more processor(s) 72 that execute software instructions, such as those used to define a software or computer program, stored to a tangible computer-readable medium (not shown in FIG. 3), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 70 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware.

Control unit 70 of PGW 30 provides an operating environment for subscriber management module 82, bearer module 84, configuration interface 86, and PCEF 32. Subscriber management module 82 establishes one or more subscriber sessions 74 for a mobile network served by PGW 30 and manages the subscriber sessions once established. Subscriber management module 82 may store session data, received in control plane protocol messages received by PGW 30 or allocated by subscriber management module 82, for one or more subscriber sessions 74 in corresponding session contexts (also referred to as PDP contexts, not shown)). A session context stored for a subscriber session may include, for example, the PDP address allocated by the mobile network for the wireless device for use in sending and receiving user packets, routing information used by bearer module 84 in forwarding user packets such as tunnel endpoint identifiers (TEIDs) and identifiers/addresses for downstream nodes, the APN for the session, and quality of service (QoS) profiles. In some examples, functional aspects of control unit 70 are performed by a decentralized architecture or one or more services cards or "subscriber management service units." As a result, PGW 30 may achieve increased scalability to handle thousands or millions of concurrent communication sessions from mobile devices. Additional details regarding subscriber management are found in U.S. patent application Ser. No. 13/172,556, filed Jun. 29, 2011 and entitled "MOBILE NETWORK GATEWAY HAVING DECENTRALIZED CONTROL PLANE FOR ANCHORING SUBSCRIBER SESSIONS," which is incorporated by reference herein in its entirety.

Forwarding unit 80 represents a forwarding plane of PGW 30 and may include one or more network interfaces and forwarding components for forwarding service data traffic. PGW 30 may also, in some examples, include a distributed forwarding plane. Subscriber management module 82 may install forwarding information to forwarding unit 80 for processing and forwarding data traffic from the mobile devices. Forwarding unit 80, for instance, receives user packets, maps the user packets to a session context of subscriber sessions 74, and applies forwarding information to forward the user packets according to the session context data. For example, forwarding of downstream user packets by forwarding unit 80 for a particular subscriber session may include encapsulating the user packets using the GPRS Tunneling Protocol (GTP) and setting the specified downstream TEID for the session within a GTP header. Forwarding unit 80 may receive a representation of rating groups 64 and perform aspects of PCEF 32 for subscriber sessions 74 to permit high-speed credit control. Example details on subscriber management module 82 constructing subscriber-specific forwarding paths within forwarding unit 80 can be found in U.S. patent application Ser. No. 13/172,505, filed Jun. 29, 2011 and entitled "VARIABLE-BASED FORWARDING PATH CONSTRUCTION FOR PACKET PROCESSING WITHIN A NETWORK DEVICE," the entire contents being incorporated herein by reference.

Configuration interface 86 of control unit 70 by which a network management system, a PCRF, or in some instances an administrator, sets configuration information 73 to install subscription information, static PCC rules, and other configuration data to control the operation of PGW 30 with respect to subscriber sessions 74. Configuration interface 86 may include a command line and/or graphical user interface (CLI or GUI) or execute a device management protocol such as NETCONF or Simple Network Management Protocol (SNMP), for instance, to request and set configuration information 73. PGW 30 may implement configuration information 73 using a management information base (MIB).

Configuration information 73, in the example of FIG. 3, includes charging profiles 76, trigger profiles 78, and rating groups 64. PGW 30 associated a particular one of charging profiles 76 with a subscriber upon or as part of establishing a bearer to transport service data traffic for services used by the subscriber. Each of charging profiles 76 specifies the charging behavior to apply according to charging characteristics of subscriber. Charging behavior includes the charging mechanism (e.g., offline/online/both/none), charging information sets, and charging transport behavior.

Each of charging profiles 76 may be associated with one or more trigger profiles 78, each of which defines effective charging events that trigger CDR creation and container addition or closure. In addition, trigger profiles 78 may each specify triggers including indicia of a change in charging conditions or bearer information for which PCEF 32 should ignore upon receipt (e.g., a change in time zone or QoS for a subscriber device). Trigger profiles 78 may further specify credit control error conditions and corresponding handling actions for various credit control errors. In some cases, a charging profile 76 may be selected for a subscriber according to a subscriber priority such that different priorities are accorded different charging control actions for actionable events. In some cases, a charging profile 76 may be selected for a subscriber according to other factors, such as Radio Access Technology (RAT) for the subscriber device, or an International Mobile Subscriber Identifier (IMSI) or International Mobile Equipment Identifier (IMSI) range into which the subscriber/subscriber device falls.

As noted above, a bearer established for one of subscriber sessions 74 is associated with one of charging profiles 76. The charging profile associated with the bearer is associated with one or more trigger profiles 78. The one or more trigger profiles 78 associated with the charging profile and, by extension, associated with the bearer, are each associated with one or more of rating groups 64. Consequently, the configuration hierarchy of configuration information 73 and implementation by PCEF 32 may enable a service provider that employs PGW 30 to configure rating group-specific credit control error handling. On receiving, from an online charging service and in response to a credit control request for a bearer, a credit control error message that identifies one of rating groups 64, PCEF 32 may apply a credit control error handling action configured in a trigger profile 8 that associated with a charging profile 76 for the bearer and that is also associated with the identified rating group 64.

As noted above, an online charging server may return credit control errors to PGW 30 as a result-code AVP that includes a code value associated with a transient or permanent failure, for instance. In some instances, trigger profiles 78 defines credit control error handling actions based on code values of the result-code AVP that override actions statically programmed within PCEF 32 for the code values, with example definitions being described below:

A trigger profile 78 may define an authorization rejected credit control error handling action to specify that the rating group is blacklisted; however, the trigger profile 78 may specify retrying with the online charging server after a configured time elapses. A credit control not applicable credit control error may include a DIAMETER_AUTHORIZATION_REJECTED result code received in a result-code AVP of an MSCC for the rating group. In some examples, the trigger profile may define the authorization rejected credit control error handling action as follows:

```
authorization-rejected {
  blacklist {
    retry-timer;
  }
}
```

A trigger profile 78 may define a credit control not applicable credit control error handling action to specify that PCEF 32 is to disable online charging for the rating group. However, if offline charging is enabled for the trigger profile, then PCEF 32 continues to apply offline charging to the rating group. If offline charging is disabled, by contrast, the credit control not applicable credit control error handling action may specify to convert to offline charging for the rating group in accordance with a grace quota. This may improve a subscriber experience by keeping the subscriber from being abruptly disconnected and can extend the bearer transport for services of the rating group until the grace quota grant is exhausted. A credit control not applicable credit control error may include a DIAMETER_CREDIT_CONTROL_NOT_APPLICABLE result code received in a result-code AVP of an MSCC for the rating group. In some examples, the trigger profile may define the credit control not applicable credit control error handling action as follows:

```
credit-control-not-applicable {
  convert-to-offline {
    grant-grace-quota;
  }
}
```

A trigger profile 78 may define a credit limit reached credit control error handling action to specify that the rating group is blacklisted; however, the trigger profile 78 may specify retrying with the online charging server after a configured time elapses. A credit control not applicable credit control error may include a DIAMETER_CREDIT_LIMIT_REACHED result code received in a result-code AVP of an MSCC for the rating group. In some examples, the trigger profile may define the credit limit reached credit control error handling action as follows:

```
credit-limit-reached {
  blacklist {
    retry-timer;
  }
}
```

If PGW 30 receives an end user service denied credit control error, PCEF 32 terminates the credit control session. A trigger profile 78 may define an end user service denied credit control error handling action to specify applying offline charging to the rating group if offline charging is enabled for the trigger profile. However, if offline charging is enabled for the trigger profile, then PCEF 32 continues to apply offline charging to the rating group. If offline charging is disabled, by contrast, the end user service denied credit control error handling action may specify to convert to offline charging for the rating group in accordance with a grace quota. This may improve a subscriber experience by keeping the subscriber from being abruptly disconnected and can extend the bearer transport for services of the rating group until the grace quota grant is exhausted. Alternatively, the trigger profile may include a statement disabling online charging, in which case PCEF 32 does not apply any charging for the rating group if offline charging is also disabled. A credit control not applicable credit control error may include a DIAMETER_END_USER_SERVICE_DENIED result code received in a result-code AVP of an MSCC for the rating group. In some examples, the trigger profile may define the end user service denied credit control error handling action as follows:

```
end-user-service-denied {
  convert-to-offline {
    grant-grace-quota;
  }
  disable-online-charging;
}
```

If PGW 30 receives a user unknown credit control error, PCEF 32 terminates the credit control session. A trigger profile 78 may define an user unknown credit control error handling action to specify applying offline charging to the rating group if offline charging is enabled for the trigger profile. However, if offline charging is enabled for the trigger profile, then PCEF 32 continues to apply offline charging to the rating group. If offline charging is disabled, by contrast, the user unknown credit control error handling action may specify to convert to offline charging for the rating group in accordance with a grace quota. This may improve a subscriber experience by keeping the subscriber from being abruptly disconnected and can extend the bearer transport for services of the rating group until the grace quota grant is exhausted. Alternatively, the trigger profile may include a statement disabling online charging, in which case PCEF 32 does not apply any charging for the rating group if offline charging is also disabled. A credit control not applicable credit control error may include a DIAMETER_USER_UNKNOWN result code received in a result-code AVP of an MSCC for the rating group. In some examples, the trigger profile may define the user unknown credit control error handling action as follows:

```
user-unknown {
  convert-to-offline {
    grant-grace-quota;
  }
  disable-online-charging;
}
```

The above descriptions of credit control error handling actions make reference to a grace quota, which enables configuration in trigger profiles 78 of a grace quota grant at various levels of rating group failures in response to a credit control request (CCR) initial request or update request. Again, this may provide an improved subscriber experience by avoiding abrupt disconnection for so long as the grace quota has credit remaining. The grace quota configuration may permit specifying grace quota time limits or volume in the uplink and/or downlink direction after the allocated rating group quota has been exhausted. In other words, PCEF 32 may allocate the specified grace quota when the quota for the rating group has been exhausted by usage by services associated with the rating group. In some examples, the trigger profile may define the grant quota for a grace quota as follows:

```
grant-quota {
  cc-octet-both volume-quota-both;
  cc-octet-downlink volume-quota-dl;
  cc-octet-uplink volume-quota-ul;
  cc-time time-quota;
}
```

Trigger profiles 78 may also specify error handling actions for credit control errors that are not based on a credit control error message received from an online charging server. Again, such error handling actions may be made rating group-specific by association of one or more rating groups 64 with a trigger profile according to a configuration hierarchy of configuration information 73. Error handling actions for credit control errors that are not based on a credit control error message from an online charging server may handle instances in which, e.g., the online charging server is not responsive or provides unintelligible responses.

For example, a trigger profile 78 may specify respective error handling actions for errors due to an online charging server failing to adequately respond to a credit control request initial request or update request. The error handling actions may define an initial request or update request error handling action to specify applying offline charging to the rating group if offline charging is enabled for the trigger profile. However, if offline charging is enabled for the trigger profile, then PCEF 32 may continue to apply offline charging to the rating group. If offline charging is disabled, by contrast, the initial request and update request credit control error handling action may specify to convert to offline charging for the rating group in accordance with a grace quota. This may improve a subscriber experience by keeping the subscriber from being abruptly disconnected and can extend the bearer transport for services of the rating group until the grace quota grant is exhausted. Alternatively, the trigger profile may include a statement disabling online charging, in which case PCEF 32 does not apply any charging for the rating group if offline charging is also disabled. The trigger profile may also include a statement granting a grace quota for online charging in anticipation of receiving a response to the initial request or update request. In some examples, the trigger profile may define the initial request and update request credit control error handling actions as follows:

```
initial-request {
  convert-to-offline {
    grant-grace-quota;
  }
  disable-online-charging;
  grant-grace-quota;
}
update-request {
  convert-to-offline {
    grant-grace-quota;
  }
  disable-online-charging;
  grant-grace-quota;
}
```

Trigger profiles 78 may also specify whether or not to block traffic for a rating group pending reauthorization when the rating group quota is exhausted. This may enable the service provider to avoid under-charging subscriber service usage and reduce revenue loss to the service provider when the quota allocated for a rating group is exhausted but reauthorization is in progress. This feature is encompassed within the failure handling ambit given that the rating group lacks remaining quota for associated services. In some examples, the trigger profile 78 may define a pending reauthorization error handling action using the following statement:

```
block-traffic-pending-reauth-no-quota;
```

Each of trigger profiles 78 may also specify whether to exclude certain changes in charging conditions from triggering a charging update for rating groups associated with the trigger profile. In some examples, the trigger profile 78 may define excluded changes in charging conditions as follows:

```
exclude {
  dcca-events;
  ms-timezone-change;
  plmn-change;
  rat-change;
  sgsn-mme-change;
  sgsn-sgw-change;
  user-location-change;
}
```

One example schema for a complete trigger profile configuration is reproduced below:

```
trigger-profiles profile-name {
  charging-method (both | none | offline | online);
  description string;
  offline {
    exclude {
      dcca-events;
      ms-timezone-change;
      plmn-change;
      qos-change;
      rat-change;
      sgsn-sgw-change;
      user-location-change;
    }
    time-limit value;
    volume-limit {
      value;
      direction (both | uplink);
    }
  }
  online {
    cc-failure-handling {
      block-traffic-pending-reauth-no-quota;
      initial-request {
        convert-to-offline {
          grant-grace-quota;
        }
        disable-online-charging;
        grant-grace-quota;
      }
      override;
      result-code-based-action {
        authorization-rejected {
          blacklist {
            retry-timer;
          }
        }
        credit-control-not-applicable {
          convert-to-offline {
            grant-grace-quota;
          }
        }
        credit-limit-reached {
          blacklist {
            retry-timer;
          }
        }
        end-user-service-denied {
          convert-to-offline {
            grant-grace-quota;
          }
          disable-online-charging;
        }
        user-unknown {
          convert-to-offline {
            grant-grace-quota;
          }
          disable-online-charging;
        }
      }
      update-request {
        convert-to-offline {
          grant-grace-quota;
        }
        disable-online-charging;
        grant-grace-quota;
      }
    }
    grant-quota {
      cc-octet-both volume-quota-both;
      cc-octet-downlink volume-quota-dl;
```

-continued

```
        cc-octet-uplink volume-quota-ul;
        cc-time time-quota;
    }
    measurement-method (none | time | volume | volume-and-
time);
    quota-threshold {
        threshold;
        override;
    }
    quota-validity-time time-in-seconds;
    reporting-level {
        override;
        (rating-group | service-identifier);
    }
    requested-service-unit {
        cc-octet-both volume-quota-both;
        cc-octet-downlink volume-quota-dl;
        cc-octet-uplink volume-quota-ul;
        cc-time time-quota;
    }
    }
    tariff-time-list {
        tariff-time;
    }
}
```

Figure 4:
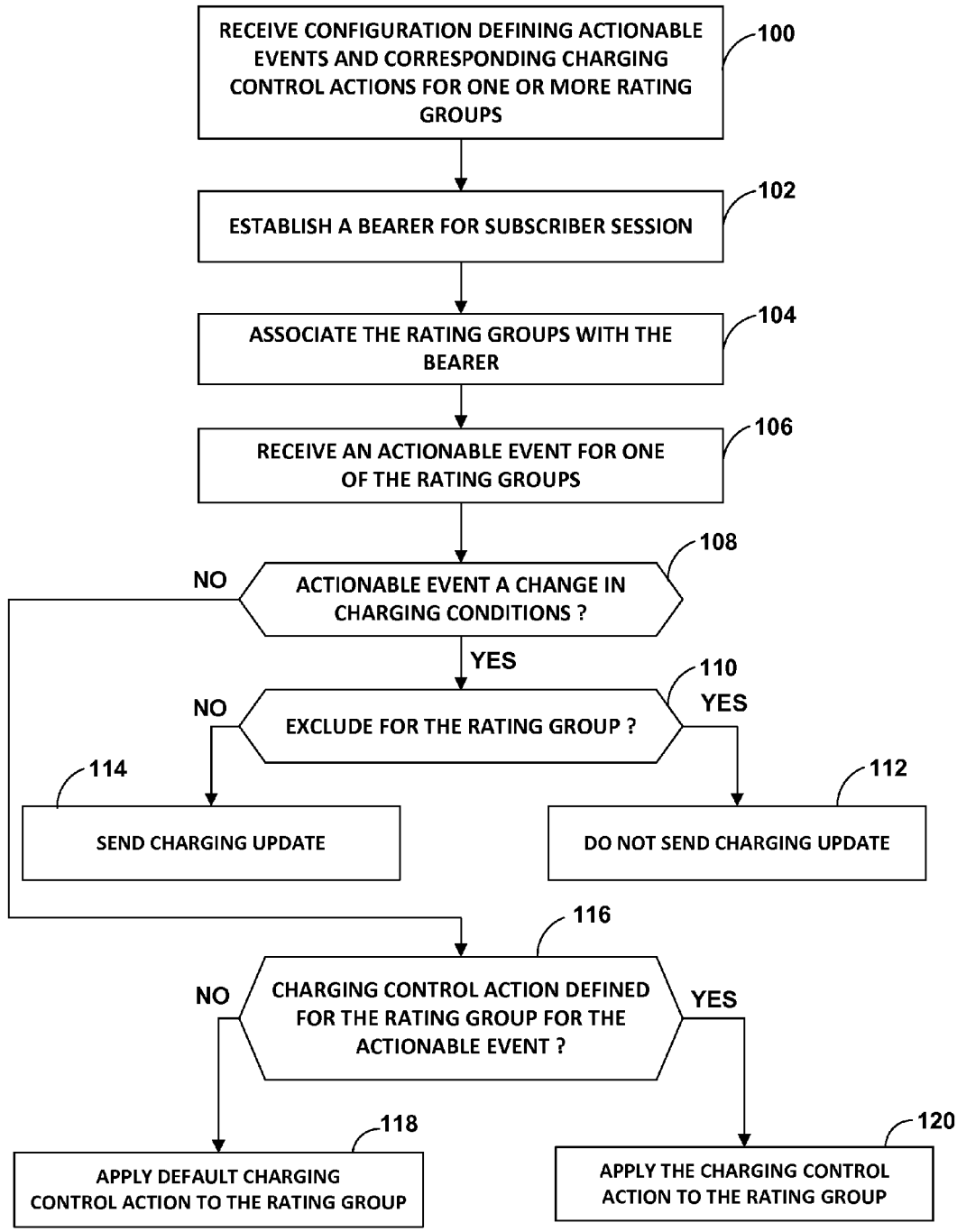
FIG. 4 is a flowchart illustrating an example mode of operation of a mobile network gateway to apply charging control at the rating group level for a subscriber session according to techniques described in this disclosure.

FIG. 4 is a flowchart illustrating an example mode of operation of a mobile network gateway to apply charging control at the rating group level for a subscriber session according to techniques described in this disclosure. The example mode of operation is described with respect to PGW 30 of FIG. 3. Configuration interface 86 of PGW 30 receives, and installs to configuration information 73, configuration information that defines actionable events and corresponding charging control actions for one or more rating groups 64 (100). The rating groups 64 may be separately configured within configuration information 73 as PCC rules, for instance.

Subscriber management module 82 establishes a bearer for a subscriber session 74 (102) and associates one or more of rating groups 64 with the bearer to aggregate rating for services transported by the bearer (104). Subsequently, PCEF 32 receives an actionable event for one of rating groups 64 associated with the bearer (106). The actionable event may include a credit control request failure or indicia of a change in charging conditions, for instance. If the actionable event indicates a change in charging conditions (YES branch of 108), PCEF 32 determines from configuration information 73 whether the indicated change is excluded from triggering a charging update (110). If the indicate change is not excluded (NO branch of 110), then PCEF 32 sends a charging update for the rating group (114). Otherwise (YES branch of 110), PCEF 32 refrains from sending the charging update for the rating group (112).

If the actionable event is not an indication of a change in charging conditions (NO branch of 108), PCEF 32 determines whether configuration information 73 defines a charging control action for the rating group for the actionable event (116). If configuration information 73 defines a charging control action (YES branch of 116), then PCEF 32 applies the charging control action to the rating group (120). Otherwise (NO branch of 116), PCEF 32 may apply a default charging control action or no charging control action to the rating group in response to the actionable event (118).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
    receiving, with a mobile network gateway that performs charging control for a mobile network, configuration information that defines a first rating group and a second rating group for a subscriber session, wherein the first rating group is associated with a first service for the subscriber session and the second rating group is associated with a second service for the subscriber session, and wherein the configuration information defines an actionable event and a corresponding charging control action for the first rating group;
    establishing, with the mobile network gateway, a bearer of the mobile network for the subscriber session and associating the first rating group and the second rating group with the bearer;
    determining, with the mobile network gateway, the occurrence of the actionable event defined by the configuration information for the first rating group; and
    applying, in response to the determining and based on the association of the first service with the first rating group, the corresponding charging control action for the actionable event for the first rating group to the first service associated with the first rating group without applying the corresponding charging control action for the actionable event to the second service associated with the second rating group.

2. The method of claim 1, wherein the configuration information defines the actionable event as receiving a credit control error message with the mobile network gateway, the method further comprising:
applying the corresponding charging control action for the credit control error message to the first service associated with the first rating group by modifying processing of service data traffic for the first service associated with the first rating group.

3. The method of claim 2, wherein the modifying processing of service data traffic comprises one of converting to offline charging, disabling online charging, granting a grace quota for online charging, and granting a grace quota for offline charging for the first service associated with the first rating group.

4. The method of claim 2, wherein the modifying processing of service data traffic comprises blacklisting service data traffic pending credit authorization, the method further comprising:
retrying a credit control request for the first rating group in accordance with the corresponding charging control action.

5. The method of claim 2, wherein the configuration information defines the actionable event as receiving one of an end user service denied error, credit control not applicable error, credit limit reached error, user unknown error, or authorization rejected error in the credit control error message.

6. The method of claim 1,
wherein the configuration information defines the actionable event as receiving a control message with the mobile network gateway, and
wherein the control message comprises indicia of a change in charging conditions for the subscriber session, the method further comprising:
applying the corresponding charging control action for the credit control message to the first service associated with the first rating group by excluding a charging update from being sent to a charging server for the first rating group.

7. The method of claim 1, wherein applying the corresponding charging control action for the actionable event to the first service associated with the first rating group comprises overriding, for the first rating group, a charging control action configured for the bearer.

8. The method of claim 1,
wherein the configuration information defines an actionable event and a corresponding charging control action for the second rating group, the method further comprising:
determining, with the mobile network gateway, the occurrence of the actionable event defined by the configuration information for the second rating group; and
applying, in response to the occurrence of the actionable event defined by the configuration information for the second rating group and based on the association of the second service with the second rating group, the corresponding charging control action for the actionable event defined by the configuration information for the second rating group to the second rating group.

9. The method of claim 1, further comprising:
sending, from the mobile network gateway to an online charging server, a credit control request message requesting credit authorization for the first rating group; and
receiving, with the mobile network gateway, credit control answer message having a Multiple-Services-Credit-Control attribute value pair,
wherein the Multiple-Services-Credit-Control attribute value pair includes a Rating-Group attribute value pair that identifies the first rating group and a Result-Code attribute value pair that is responsive to the credit control request message and that specifies a code value, and
wherein determining the occurrence of the actionable event comprises mapping the code value to the actionable event defined by the configuration information.

10. The method of claim 1,
wherein the actionable event comprises a first actionable event and the charging control action comprises a second charging control action,
wherein the configuration information defines the first actionable event as associated with a code value for a Result-Code attribute value pair,
wherein the configuration information defines a second actionable event as associated with a credit control error message that is responsive to a credit control request initial request or update request and also defines, for the second actionable event, a corresponding second charging control action for the first rating group, and
wherein determining, with the mobile network gateway, the occurrence of the actionable event defined by the configuration information for the first rating group comprises determining the occurrence of either the first actionable event or the second actionable event, and
wherein applying the corresponding charging control action for the actionable event to the first service associated with the first rating group comprises applying one of ether the first charging control action and the second charging control action.

11. A non-transitory computer-readable medium comprising instructions for causing one or more programmable processors to:
receive, with a mobile network gateway that performs charging control for a mobile network, configuration information that defines a first rating group and a second rating group for a subscriber session, wherein the first rating group is associated with a first service for the subscriber session and the second rating group is associated with a second service for the subscriber session, and wherein the configuration information defines an actionable event and a corresponding charging control action for the first rating group;
establish, with the mobile network gateway, a bearer of the mobile network for the subscriber session and associating the first rating group and the second rating group with the bearer;
determine, with the mobile network gateway, the occurrence of the actionable event defined by the configuration information for the first rating group; and
apply, in response to the determining and based on the association of the first service with the first rating group, the corresponding charging control action for the actionable event for the first rating group to the first service associated with the first rating group without applying the corresponding charging control action for the actionable event to the second service associated with the second rating group.

12. A mobile network gateway comprising:
a control unit having at least one processor;
configuration information that defines a first rating group and a second rating group for a subscriber session, wherein the first rating group is associated with a first service for the subscriber session and the second rating group is associated with a second service for the subscriber session, and wherein the configuration information defines an actionable event and a corresponding charging control action for the first rating group;
a subscriber management module of the control unit configured to establish a bearer of the mobile network for the subscriber session and associate the first rating group and the second rating group with the bearer; and
a charging client of the control unit configured to determine the occurrence of the actionable event defined by the configuration information for the first rating group and apply, in response to the determining and based on the association of the first service with the first rating group, the corresponding charging control action for the actionable event for the first rating group to the first service associated with the first rating group without applying the corresponding charging control action for the actionable event to the second service associated with the second rating group.

13. The mobile network gateway of claim 12,
wherein the configuration information defines the actionable event as receiving a credit control error message,
wherein the charging client is configured to apply the corresponding charging control action for the credit control error message to the first service associated with the first rating group by modifying processing of service data traffic for the first service associated with the first rating group.

14. The mobile network gateway of claim 13, wherein the charging client is configured to modify processing of service data traffic by one of converting to offline charging, disabling online charging, granting a grace quota for online charging, and granting a grace quota for offline charging for the first service associated with the first rating group.

15. The mobile network gateway of claim 13,
wherein the charging client is configured to modify processing of service data traffic by blacklisting service data traffic pending credit authorization,
wherein the charging client is configured to retrying a credit control request for the first rating group in accordance with the corresponding charging control action.

16. The mobile network gateway of claim 13, wherein the configuration information defines the actionable event as receiving one of an end user service denied error, credit control not applicable error, credit limit reached error, user unknown error, or authorization rejected error in the credit control error message.

17. The mobile network gateway of claim 12,
wherein the configuration information defines the actionable event as receiving a control message, and
wherein the control message comprises indicia of a change in charging conditions for the subscriber session,
wherein the charging client is configured to apply the corresponding charging control action for the credit control message to the first service associated with the first rating group by excluding a charging update from being sent to a charging server for the first rating group.

18. The mobile network gateway of claim 12,
wherein the configuration information defines an actionable event and a corresponding charging control action for the second rating group,
wherein the charging client is configured to determine the occurrence of the actionable event defined by the configuration information for the second rating group, and
wherein the charging client is configured to apply, in response to the occurrence of the actionable event defined by the configuration information for the second rating group and based on the association of the second service with the second rating group, the corresponding charging control action for the actionable event defined by the configuration information for the second rating group to the second service associated with the second rating group.

19. The mobile network gateway of claim 12,
wherein the charging client is configured to send, to an online charging server, a credit control request message requesting credit authorization for the first rating group,
wherein the charging client is configured to receive credit control answer message having a Multiple-Services-Credit-Control attribute value pair,
wherein the Multiple-Services-Credit-Control attribute value pair includes a Rating-Group attribute value pair that identifies the first rating group and a Result-Code attribute value pair that is responsive to the credit control request message and that specifies a code value, and
wherein the charging client is configured to determine the occurrence of the actionable event by mapping the code value to the actionable event defined by the configuration information.

* * * * *